(12) United States Patent
Xie

(10) Patent No.: US 8,029,581 B2
(45) Date of Patent: Oct. 4, 2011

(54) METHOD FOR PRODUCING COAL GAS

(75) Inventor: Zhiping Xie, Guangdong (CN)

(73) Assignees: Keda Industrial Co., Ltd., Guangdong (CN); Keda (Mas) Inductrial Co., Ltd., Anhui (CN)

(*) Notice: Subject to any disclaimer, the term of this patent is extended or adjusted under 35 U.S.C. 154(b) by 0 days.

(21) Appl. No.: 12/618,462

(22) Filed: Nov. 13, 2009

(65) Prior Publication Data

US 2010/0058664 A1    Mar. 11, 2010

Related U.S. Application Data

(63) Continuation of application No. PCT/CN2007/001547, filed on May 14, 2007.

(51) Int. Cl.
*C10J 3/46* (2006.01)
(52) U.S. Cl. .................... 48/210; 48/197 R; 48/197 FM
(58) Field of Classification Search .............. 48/202
See application file for complete search history.

(56) References Cited

U.S. PATENT DOCUMENTS

| 3,991,557 | A | | 11/1976 | Donath | 60/39.06 |
| 4,198,212 | A | * | 4/1980 | Tsao | 48/210 |
| 4,272,256 | A | * | 6/1981 | Mitsak | 48/206 |
| 4,400,181 | A | | 8/1983 | Snell et al. | |
| 4,483,692 | A | * | 11/1984 | Patel | 48/210 |
| 5,154,732 | A | | 10/1992 | Hakulin et al. | |
| 5,622,534 | A | | 4/1997 | Andrus, Jr. | |
| 6,837,910 | B1 | * | 1/2005 | Yoshikawa et al. | 48/197 FM |

FOREIGN PATENT DOCUMENTS

| CN | 2055503 | 4/1990 |
| CN | 2055503 U | 4/1990 |
| CN | 1299859 A | 6/2001 |
| CN | 2461925 | 11/2001 |
| CN | 2461925 Y | 11/2001 |
| CN | 101063053 A | 10/2007 |
| WO | WO 00/71644 | 11/2000 |

OTHER PUBLICATIONS

Australian First Examination Report of Australia Application No. 2007353260, dated Jul. 29, 2010.
Supplementary European Search Report of International PCT Application No. PCT/CN2007/001547, dated Oct. 14, 2010.

* cited by examiner

*Primary Examiner* — Alexa Neckel
*Assistant Examiner* — Imran Akram
(74) *Attorney, Agent, or Firm* — J.C. Patents

(57) ABSTRACT

The present invention relates to a method for producing coal gas, including: feeding raw material pulverized coal and a high temperature gasification agent (7) into a coal gas producer (a) for reaction to produce coal gas; performing heat exchange between the coal gas coming out of the coal gas producer and a gasification agent to produce the high temperature gasification agent (7); performing heat exchange between the coal gas, after performing heat exchange with the gasification agent, and water to produce vapor (4), wherein the vapor (4) is a component of the gasification agent; and outputting the coal gas after further dust removal and desulfuration which has performed heat exchange with the water.

11 Claims, 1 Drawing Sheet

METHOD FOR PRODUCING COAL GAS

CROSS-REFERENCE TO RELATED APPLICATIONS

This application is a continuation of International Application No. PCT/CN2007/001547, filed on May 14, 2007. The contents of the above identified applications are incorporated herein by reference in its entirety.

FIELD OF THE TECHNOLOGY

The present invention relates to a method for producing coal gas, and particularly to a method for producing coal gas using pulverized coal.

BACKGROUND

The process for producing coal gas using pulverized coal generally comprises: feeding pulverized coal, vapor, air and oxygen into a coal gas producer, for reaction under a high temperature to produce the coal gas; passing the produced coal gas through a cyclone dust collector while recovering and sending pulverized coal back into the coal gas producer; the coal gas being passed through a waste heat boiler for producing vapor, and sending scrubbed and cooled coal gas to users. Since the temperature of the coal gas coming out of the coal gas producer is very high, the vapor produced through the waste heat boiler is in excess of what is needed for producing the coal gas, and the excessive portion will be used for other applications. At the same time, since the temperature of gasification agent composed of vapor, air and oxygen entering into the coal gas producer is relatively low, usually 65° C.-120° C., while reacting in the coal gas producer, the temperature of the gasification agent needs to be increased to 1000° C.-1100° C., a large amount of reaction heat will be consumed during increasing the temperature of the gasification agent. All of the factors above lead to the coal consumption in producing unit coal gas being relatively high, usually above 0.3 kg/Nm$^3$-0.4 kg/Nm$^3$; and the thermal value of the coal gas produced using above traditional process is low.

SUMMARY

To solve the problems above, an object of the present invention is to provide a method for producing coal gas, which not only lowers the coal consumption, but also increases the thermal value of the produced coal gas.

To achieve the object above, the present invention provides a method for producing coal gas, including:

feeding raw material pulverized coal and a high temperature gasification agent into a coal gas producer for reaction to produce coal gas;

performing heat exchange between the coal gas coming out of the coal gas producer and a gasification agent to produce the high temperature gasification agent;

performing heat exchange between the coal gas, after performing heat exchange with the gasification agent, and water to produce vapor, wherein the vapor is a component of the gasification agent; and after conducting heat exchange with water, and after further dust removal and desulfuration, outputting the coal gas.

After production of the coal gas and before performing heat exchange with the gasification agent, a high temperature dry separation processing is performed and the separated pulverized coal is sent back to the coal gas producer. After production of the high temperature gasification agent and before performing heat exchange between coal gas and water, a low temperature dry separation processing is performed and the separated pulverized coal is sent back to the coal gas producer.

During heat exchange with the gasification agent, the temperature drop of the coal gas coming out of the coal gas producer is 500° C.-700° C. The heat exchange of the coal gas and the water is performed within a waste heat boiler, with the temperature at an inlet of the waste heat boiler being 400° C.-500° C.

The gasification agent can be air and vapor, or oxygen-enriched air and vapor, or pure oxygen and vapor.

At the start of operation, the raw material pulverized coal is fed through a lower part of the coal gas producer. When the temperature of the coal gas producer is normal in operation, the raw material pulverized coal is fed through an upper part of the coal gas producer.

The high temperature gasification agent can be fed through three locations of the coal gas producer. The first one of the three locations is at a lower part of the coal gas producer, where the input amount of the high temperature gasification agent is 50%-60%; the second location is at a middle part of the coal gas producer, where the input amount of the high temperature gasification agent is 35%-45%; the third one is at the middle part of the coal gas producer, where the pulverized coal respectively separated by a high temperature separator and a low temperature separator and 5% of the total high temperature gasification agent are fed into the coal gas producer, The temperature of the high temperature gasification agent is 750° C.-850° C.

The pulverized coal content of the coal gas supplied to users is ≦5 mg/Nm$^3$. The proportion of air, or oxygen-enrich air, or pure oxygen in the gasification agent is 50-80%, and the proportion of vapor in the gasification agent is 20-50%.

The method for producing coal gas according to by the present invention allows heat exchange to be performed between the gasification agent entering into the coal gas producer and the coal gas exiting the coal gas producer, thereby the temperature of the gasification agent entering into the coal gas producer is able to reach 750° C.-850° C., the heat consumption in the reaction of the pulverized coal and the high temperature gasification agent is 20%-30% lower than that of the gasification agent at the normal temperature, and the combustible component of the coal gas is 20%-30% higher than that of mixed coal gas obtained using gasification agent at normal temperature. Particularly, the present invention performs, via a heat exchanger, a heat exchange between the coal gas coming out of the coal gas producer at 950° C.-1100° C. and the gasification agent at 60° C.-100° C. After the heat exchange, temperature of the gasification agent reaches 750° C.-850° C., and the coal gas at a temperature lowered to 400° C.-500° C. reenters the waste heat boiler to produce vapor, with the temperature of the coal gas after coming out of the waste heat boiler being lowered to about 150° C., then the coal gas enters into a Venturi dust collector and a scrubbing tower for dust removal, and finally the coal gas is sent to users after being subjected to desulfuration. Through the heat exchange between the coal gas and the gasification agent, the heat of the coal gas is supplied to the gasification agent, and the temperature rise of the gasification agent results in the increase of the vapor content and speeds up the reaction with the coal, which allows low coal consumption of the coal gas producer and good quality of the coal gas, and more importantly, the heat of the coal gas is effectively recovered, thereby achieving a 20%-30% reduction of the coal consumption. In comparison with the coal consumption of 0.3 Kg/Nm$^3$-0.4 Kg/Nm$^3$ in prior art coal gas producer using a gasification agent at a normal temperature, the coal consumption of the mixed coal gas of the present invention is lowered to 0.22 Kg/Nm$^3$-0.25 Kg/Nm$^3$. In addition, through the adoption of the high temperature separation and the low temperature separation in the present invention, the amount of the pulverized coal carried by the coal gas is significantly reduced, and the separated pulverized coal is fed back into the coal gas producer again, thus further lowering the coal consumption of the coal gas producer. The thermal value of the mixed coal gas produced by the present invention using the gasification agent containing air and vapor is 5600 KJ/Nm³-6000 KJ/Nm³ (1350 kcal/Nm³-1450 kcal/Nm³), and the coal consumption is only 0.22 Kg/Nm³-0.25 Kg/Nm³, thus the coal gas is low in coal consumption, high in thermal value, high in productivity, and low in cost.

DETAILED DESCRIPTION

Figure 1:
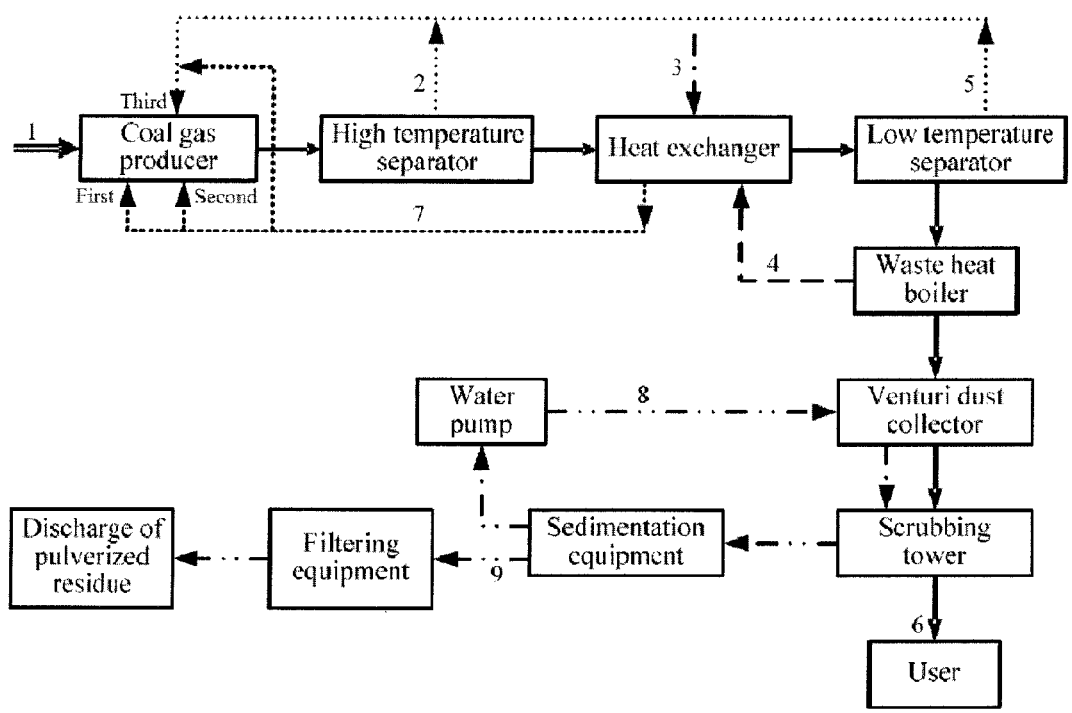
FIG. 1 is a flowchart of an embodiment of the method for producing coal gas of the present invention.

An embodiment of the present invention will be described hereinafter with reference to FIG. 1.

Raw material pulverized coal 1 with a water content of 8% is fed by a coal feeder into a coal gas producer. If water content is above 8%, the raw material pulverized coal 1 needs to be dried first. The raw material pulverized coal 1 will be fed through the lower part of the coal gas producer at the start of operation, and when the temperature of the coal gas producer reaches a normal state, the raw material pulverized coal 1 will be fed through the upper part of the coal gas producer. At the same time, a high temperature gasification agent 7 at 750-850° C. is fed through three locations of the coal gas producer, for reaction within the coal gas producer to produce coal gas, wherein the first one of the three locations is at the lower part of the coal gas producer, where the amount of the high temperature gasification agent being fed is 50%-60% of the total high temperature gasification agent, the second location is at the middle part of the coal gas producer, where the amount of the high temperature gasification agent being fed is 35%-45% of the total high temperature gasification agent, and the third one is around an inlet for circulated coal of the coal gas producer and is also at the middle part of the coal gas producer, where both the circulated coal and about 3%-6% of the total high temperature gasification agent are fed into the coal gas producer. Preferably, the high temperature gasification agent fed into the coal gas producer is 5%. The coal gas is passed through a high temperature dry separator to separate pulverized coal 2 with a particle size greater than 10 nm carried in the coal gas, and pulverized coal 2 is fed back into the coal gas producer as circulated coal, and the separated coal gas reenters into a heat exchanger and exchanges heat with the gasification agent consisting of air 3 and vapor 4, causing the gasification agent to increase in temperature and become a high temperature gasification agent 7 at 750-850° C., while the temperature drop of the coal gas is 500-700° C. The coal gas comes out of the heat exchanger at 400-500° C. and reenters a low temperature dry separator, for further separating all the pulverized coal particles with a diameter greater than 5 nm and 50% of the coal particles with a diameter of 0-5 nm contained therein, and the separated pulverized coal 5 is fed back into the coal gas producer as circulated coal. After coming out of the low temperature separator, the coal gas enters into a waste heat boiler to produce vapor 4, which is a component of the gasification agent. The coal gas coming out of the waste heat boiler enters into a Venturi wet-type dust collector and a scrubbing tower for desulfuration and further dust removal, wherein scrub solution 8 is maintained by a water pump to circulate in the Venturi wet-type dust collector, the scrubbing tower, and sedimentation equipment, 90% of coal particles less than 5 μm are separated through above wet-type dust removal, the pulverized residues 9 are discharged after sedimentation by the sedimentation equipment, and the coal gas 6 after being scrubbed by the scrubbing tower can be sent to users. The air in above process can also be oxygen-enriched air, or pure oxygen. Since the gasification agent enters the coal gas producer after being preheated, the above process for producing the coal gas reduces the coal consumption, and at the same time, since the raw material pulverized coal enters the coal gas producer through two inlets and the pulverized coal carried by the coal gas is sent back into the coal gas producer, the coal consumption is further reduced, thus making the coal consumption to be only 0.22 Kg/Nm³-0.25 Kg/Nm³ of coal gas, while increasing the thermal value of the coal gas, which is 5600 KJ/Nm³-6000 KJ/Nm³ of coal gas (1350 kcal/Nm³-1450 kcal/Nm³ of coal gas). Specifically, in this embodiment, the amount of air consumed is 0.6-0.65 Kg/Nm³ of coal gas. The components of the produced coal gas are: $H_2$: 15%-20%; CO: 25%-30%; $CO_2$: 5%-8%; $N_2$: 40%-50%; $CH_4$: 2%-3%; and $O_2$: 0.2%-0.5%. The ratio of air, or oxygen-enriched air, or pure oxygen in the gasification agent is 75-80%, and that of the vapor is 20-25%.

There are several combinations of parameters as follows in this embodiment:

| Preheating temperature of the gasification agent (° C.) | Temperature of the gas at the outlet of the heat exchanger (° C.) | Coal consumption (Kg/Nm³) | Thermal value of coal gas (KJ/Nm³) |
| --- | --- | --- | --- |
| 750 | 500 | 0.25 | 5600 |
| 850 | 400 | 0.22 | 6000 |
| 800 | 450 | 0.24 | 5800 |

Following is the calculation of heat consumption in producing 1 Kcal of coal gas taking the air and the vapor as the gasification agent, to further support theoretically the implementation of the present invention.

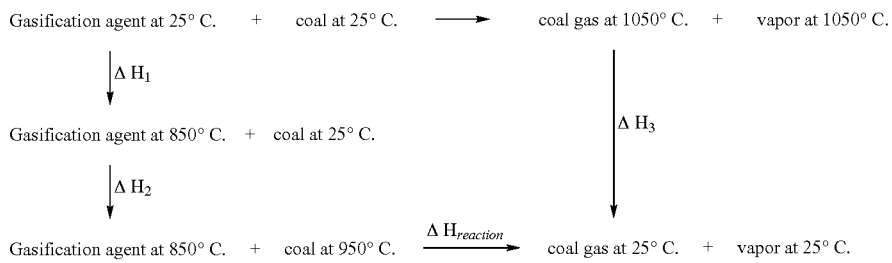

The specific heat of the mixed gas: 0.33 kcal/Nm³° C.

$$\Delta H_1 = \text{heat carried in by the mixed gas}$$
$$= \text{amount of the mixed gas of 1 Nm}^3 \text{ of}$$
$$\text{coal gas} \times 850° \text{ C.} \times 0.33$$
$$= 0.8066 \times 850 \times 0.33$$
$$= 5068 \text{ kcal/kmol. of coal gas}$$

Coal consumption=0.25 kg/Nm³=5.6 kg/kmol

Specific heat of the raw material=0.5 kal/kg° C.

$$\begin{aligned}\Delta H_2 &= \text{heat needed in temperature rise of cold coal} \\ &= \text{coal consumption} \times \text{specific heat of the raw} \\ &\quad \text{material} \times \text{temperature of coal} \times \text{heat} \\ &\quad \text{needed in vaporizing the raw material water} \\ &= (0.25 - 0.25 \times 0.1) \times 0.5 \times (950 - 25) \times \\ &\quad 22.4 + 0.25 \times 0.1 \times 580 \times 22.4 \\ &= 2655.8 \text{ kcal/kmol}\end{aligned}$$

$C+O_2 \rightarrow CO_2 \; H_{co_2}°=97700$ kcal/kmol $C+O_2/2 \rightarrow CO \; H_{co}°=29400$ kcal/kmol $C+H_2O \rightarrow CO \; H_{co}°=-28300$ kcal/kmol The content of $CO_2$ is 7%, and the air consumption of 1 kmal of coal gas is 4.55/7.19=0.632 kcal/kmol of coal gas.

The content of oxygen in 0.632 kmol of air is 0.132 kmol, and the oxygen consumption of CO is a half of that of $CO_2$.

$$\begin{aligned}\Delta H_{reaction} &= \text{heat generated by air in producing CO}_2 + \\ &\quad \text{heat generated by air in producing CO} + \\ &\quad \text{heat generated by vapor in producing CO}_2 \\ &= 0.07 \times 97700 + [(0.132 - 0.07) \times 2 \times 29400] + \\ &\quad [0.265 - 2 \times (0.132 - 0.07)] \times (-28300) \\ &= 64694.3 \text{ kcal/kmol of coal gas}\end{aligned}$$

Specific heat of coal gas is 0.33 kal/Nm³ of coal gas.
1 Nm³ of coal gas generates 1.04 Nm³ of wet coal gas.

$\Delta H_3$=8025.5 kcal/kmol.

Thus, the heat consumed in producing 1 kmol of coal gas is:

$$\begin{aligned}Q &= \Delta H_1 + \Delta H_2 + \Delta H_3 + \Delta H_{reaction} \\ &= 5068 + (-2655.8) + 8025.5 + 6494.3 \\ &= 881 \text{ kcal/kmol of coal gas}\end{aligned}$$

It can be seen from the calculation that the result is approximately balancing, and 881 kcal/kmol of coal gas is remained, which can be used to generate more $H_2$.

It should be noted that the above embodiment is only used for illustrating the technical solution of the present invention but not intended to limit the present invention, while the present invention is described in detail with reference to a preferred embodiment, it should be appreciated by those skilled in the art that modifications or equivalents may be made to the technical solution of the present invention without departing from the spirit and scope of the technical solution.

What is claimed is:

1. A method for producing coal gas, comprising:
    step a: feeding raw material pulverized coal and a high temperature gasification agent into a coal gas producer for reaction to produce coal gas;
    step b: performing a high temperature dry separation processing on the coal gas and sending pulverized coal separated from the coal gas back to the coal gas producer;
    step c: performing heat exchange between the separated coal gas coming from step b and a gasification agent to produce the high temperature gasification agent;
    step d: performing a low temperature dry separation processing on the coal gas coming from step c and sending pulverized coal separated from the coal gas coming from step c back to the coal gas producer;
    step e: performing heat exchange between the separated coal gas coming from step d and water to produce vapor, wherein the vapor as a component of the gasification agent is sent back to step c for heat exchanging; and
    step f: after heat exchange with the water and after further dust removal and desulfurization, outputting the coal gas;
    wherein the high temperature gasification agent is fed through three locations of the coal gas producer; the first one of the three locations is at the lower part of the coal gas producer, where the input amount of the high temperature gasification agent is 50%-60%; the second location is at the middle part of the coal gas producer, where the input amount of the high temperature gasification agent is 35%-45%; and the third one is at the middle part of the coal gas producer, where the pulverized coal separated from the coal gas in step b is fed, the pulverized coal separated from the coal gas in step d is fed, and 3%-6% of the high temperature gasification agent is fed.

2. The method according to claim 1, wherein temperature drop of the coal gas coming out of the coal gas producer after heat exchange with the gasification agent is 500° C.-700° C.

3. The method according to claim 2, wherein the temperature of the high temperature gasification agent is 750° C.-850° C.

4. The method according to claim 1, wherein the heat exchange between the coal gas and the water is performed within a waste heat boiler, with the temperature at an inlet of the waste heat boiler being 400° C.-500° C.

5. The method according to claim 4, wherein the temperature of the high temperature gasification agent is 750° C.-850° C.

6. The method according to claim 1, wherein the gasification agent is air and vapor, or oxygen-enriched air and vapor, or pure oxygen and vapor.

7. The method according to claim 6, wherein the temperature of the high temperature gasification agent is 750° C.-850° C.

8. The method according to claim 1, wherein the raw material pulverized coal is fed through the lower part of the coal gas producer.

9. The method according to claim 1, wherein the raw material pulverized coal is fed through the upper part of the coal gas producer.

10. The method according to claim 1, wherein the temperature of the high temperature gasification agent is 750° C.-850° C.

11. The method according to claim 1, wherein in step a, the raw material pulverized coal is fed through the lower part of the coal gas producer at the beginning of operation of the coal gas producer, and when the temperature of the coal gas producer reaches a normal state in the operation, the raw material pulverized coal is fed through the upper part of the coal gas producer.

* * * * *